US006585004B1

(12) United States Patent
Porter

(10) Patent No.: US 6,585,004 B1
(45) Date of Patent: Jul. 1, 2003

(54) MULTI-STAGE FLOW CONTROL

(75) Inventor: Don B. Porter, Avra Valley, AZ (US)

(73) Assignee: Delaware Capital Formation, Inc., Wilmington, DE (US)

( * ) Notice: Subject to any disclaimer, the term of this patent is extended or adjusted under 35 U.S.C. 154(b) by 29 days.

(21) Appl. No.: 10/051,884

(22) Filed: Jan. 17, 2002

(51) Int. Cl.[7] .............................................. F15B 13/043
(52) U.S. Cl. ............................ 137/625.64; 137/625.66; 251/60
(58) Field of Search ....................... 137/625.64, 625.66; 251/60

(56) References Cited

U.S. PATENT DOCUMENTS

| 4,319,609 A | * | 3/1982 | Debrus .................. 137/625.64 |
| 4,674,539 A | | 6/1987 | Sloate |

* cited by examiner

Primary Examiner—Gerald A. Michalsky
(74) Attorney, Agent, or Firm—Franklin L. Gubernick

(57) ABSTRACT

Disclosed is system for controlling a dynamic hydraulic component, such as a hydraulic actuator or motor. The system allows for either zero, restricted or full fluid flow to the hydraulic component. This enables either no movement, slow, precise movements, or rapid, major movements of the component. The functionality of the system is accomplished using a multi-pilot system acting on a spool valve that has a pilot piston and at least one stop piston. The stop piston(s) can move to limit the movement of the pilot piston.

27 Claims, 12 Drawing Sheets

MULTI-STAGE FLOW CONTROL

FIELD OF THE INVENTION

The invention is in the field of fluid control. More particularly, the invention is a multi-piston spool valve capable of controlling the flow of fluid to a dynamic hydraulic component, such as a hydraulic actuator or motor. The valve enables either zero, restricted or full fluid flow to the hydraulic component, thereby allowing multiple stages or levels of control of the component. A user of the invention is thereby provided with the ability to cause the controlled component to make rapid, major movements, or slower, more precise movements.

The valve's functionality is achieved using a system of multiple pilot valves that act on associated pistons located within the valve. The valve's spool is moved through the action of at least one pilot piston. One or more stop pistons are employed to limit the movement of the pilot piston(s).

BACKGROUND OF THE INVENTION

The flow of fluid to a hydraulic actuator, hydraulic motor, or other dynamic hydraulic device is often controlled through the use of a pilot-operated spool valve. In most cases, the spool valve is used-solely to provide directional control whereby the controlled device either receives no flow, maximum flow in a first direction, or maximum flow in a reverse direction. To accomplish this functionality, the pilot acts to cause a maximum movement of the valve's spool. Once the spool has moved fully in one direction, maximum fluid flow is enabled to the controlled hydraulic device. To cause the controlled hydraulic device to stop or reverse direction, a reverse movement of the valve's spool is required. It should be noted that when maximum flow is enabled, the controlled device moves at its maximum speed.

There are some applications where a pilot-operated spool valve is employed to provide proportional control of a hydraulic component. In this type of application, it is usually desired to cause the controlled hydraulic component to move at speeds greater than zero but less than the component's maximum speed. In some applications, proportional control is achieved using a spool-type servovalve.

One example of a servovalve designed to give a user proportional control of a dynamic hydraulic device is taught by Sloate in U.S. Pat. No. 4,674,539. The Sloate servovalve makes use of an electric motor in combination with threadedly-engaged members to slowly cause the translation of the servovalve's spool. However, the speed of operation of such a unit is severely limited. Sloate notes that changing the thread ratios employed in the device can change the speed of operation.

Proportional control of a hydraulic component enables precision control of the component. However, there are times when it would be desirable to have multi-speed control of a hydraulic device. This type of control would offer both simple directional control and precision proportional control of the hydraulic component.

A first example where multi-speed control is desirable is found when a hydraulic motor is connected to a winch. It is often advantageous to initially lift a load at a low-speed, giving one a chance to assess the security of the lifting harness, before lifting the load at full speed.

A second example may be found when a hydraulic motor is used to operate a cooling fan. A typical arrangement would employ a control valve that enables the fan to run at full speed, or not at all. There may be certain conditions or situations where one or more intermediate speeds are desirable.

A third example is presented in some marine steering systems, where a hydraulic actuator is connected to a rudder or water deflector. In this type of application, it is desirable during relatively high-speed operation of the vessel for the rudder or water deflector to move fairly slowly. This enables a precise steering control of the vessel. When traveling at a relatively low speed, such as during docking maneuvers, one needs to move the rudder or water deflector at a very high rate in order to obtain the necessary movements of the vessel in an appropriate amount of time. In addition, when the vessel is docked, it may be beneficial to rapidly move the rudder/water deflector to a predetermined storage position.

There are many other situations where multi-speed control of a hydraulic component would be advantageous. The situations would usually also require the control system to be relatively low in cost, extremely durable and highly reliable.

SUMMARY OF THE INVENTION

The invention is a multi-piston spool valve capable of controlling a dynamic hydraulic component, such as a hydraulic actuator or motor. The valve allows a user to enable either a zero, restricted or full fluid flow to the hydraulic component. When a restricted flow of fluid is enabled, the user can achieve slow, precise movements of the component. When full fluid flow is enabled, the user can cause major, maximum-speed movements of the controlled component.

The operation of the valve is accomplished using a system of pilot valves. The system comprises a primary pilot valve arrangement (primary pilot) and at least one secondary pilot valve (secondary pilot). The primary pilot is operatively connected to at least one pilot piston located in the spool valve. The spool is operatively connected to the pilot piston(s) whereby the pilot piston(s) function to cause a translation of said spool. The secondary pilot is operatively connected to at least one stop piston located in the spool valve. The stop piston(s) function to oppose/limit the full movement of the pilot piston(s).

When full fluid flow to the component is desired, the primary pilot directs pressurized fluid into a chamber in the spool valve that is located adjacent a pilot piston. The fluid then applies pressure on one end of said pilot piston. This causes the pilot piston, and the operatively-connected spool, to move. Without any opposition from the stop piston(s), the pilot piston and spool can move to their maximum extent. This results in an outlet port in the spool valve being fully uncovered, thereby enabling the maximum rate of fluid flow to the controlled hydraulic component.

When a restricted flow of fluid to the component is desired, the primary pilot and at least one secondary pilot are actuated. When only one secondary pilot is employed, the secondary pilot sends pressurized fluid into a chamber associated with a stop piston. This causes the stop piston to be positioned at a predetermined location. At the same time, the primary pilot acts in the same manner as previously described, sending pressurized fluid into a chamber in the spool valve and causing a pilot piston to move the spool. However, the movement of the pilot piston and the spool is stopped short by the stop piston. As a result, a fluid outlet in the spool valve that leads to the controlled component will be only partially uncovered, resulting in a restriction in the fluid flow path. This leads to an intermediate flow of pressurized fluid to the controlled hydraulic component.

When the spool valve includes multiple stop pistons, multiple secondary pilot valves (secondary pilots) are employed to control the movement of the stop pistons. The multiple stop pistons interact to provide multiple limit stops that affect a pilot piston's allowed travel. When two stop pistons are employed, the spool valve will be capable of providing five levels or stages of fluid flow to the controlled hydraulic component.

A fluid flow control valve and system in accordance with the invention is relatively low in cost and requires a minimal number of solenoids to control the valve's operation. The system's simple design enables it to be highly reliable and extremely durable.

DETAILED DESCRIPTION OF THE DRAWINGS

Figure 1:
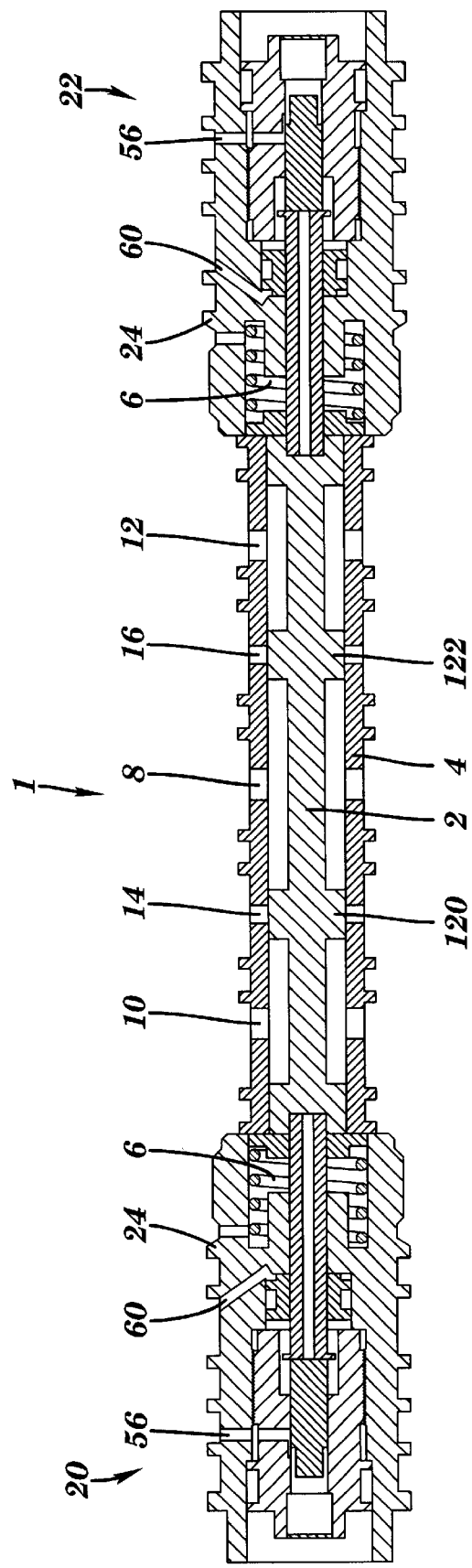
FIG. 1 is a cross-sectional view of a multi-piston spool valve in accordance with the invention.

Referring now to the drawings in greater detail, wherein like reference numbers refer to like parts throughout the several figures, there is shown by the numeral 1 a multi-piston spool valve in accordance with the invention.

The valve 1 includes a central spool 2 slidably received within a sleeve/body 4. The spool is spring-centered by springs 6 located adjacent each end of the spool. The sleeve/body 4 is shown having a center-located port 8 that can be connected to a source of pressurized fluid, two ports 10 and 12 that can be connected to a fluid return, and two ports 14 and 16 that can be connected to a load. The load would typically be a dynamic hydraulic component such as a hydraulic actuator or hydraulic motor.

Located at each end of the valve 1 are identical piston assemblies 20 and 22. Piston assembly 20 is seen in more detail in FIGS. 2–4 wherein the valve 1 is shown in three different flow configurations.

Piston assembly 20 includes a body 24 that features a shaped cavity 26 at one end for receiving one of the springs 6. While one end of the spring 6 presses on the body 24, the other end of the spring 6 presses on a flange member 28. Member 28 presses against an end 30 of the spool. Whenever the spool moves to the left of the null, no-flow position shown in FIG. 2, it pushes member 28 to the left, thereby compressing the adjacent spring 6.

Figure 2:
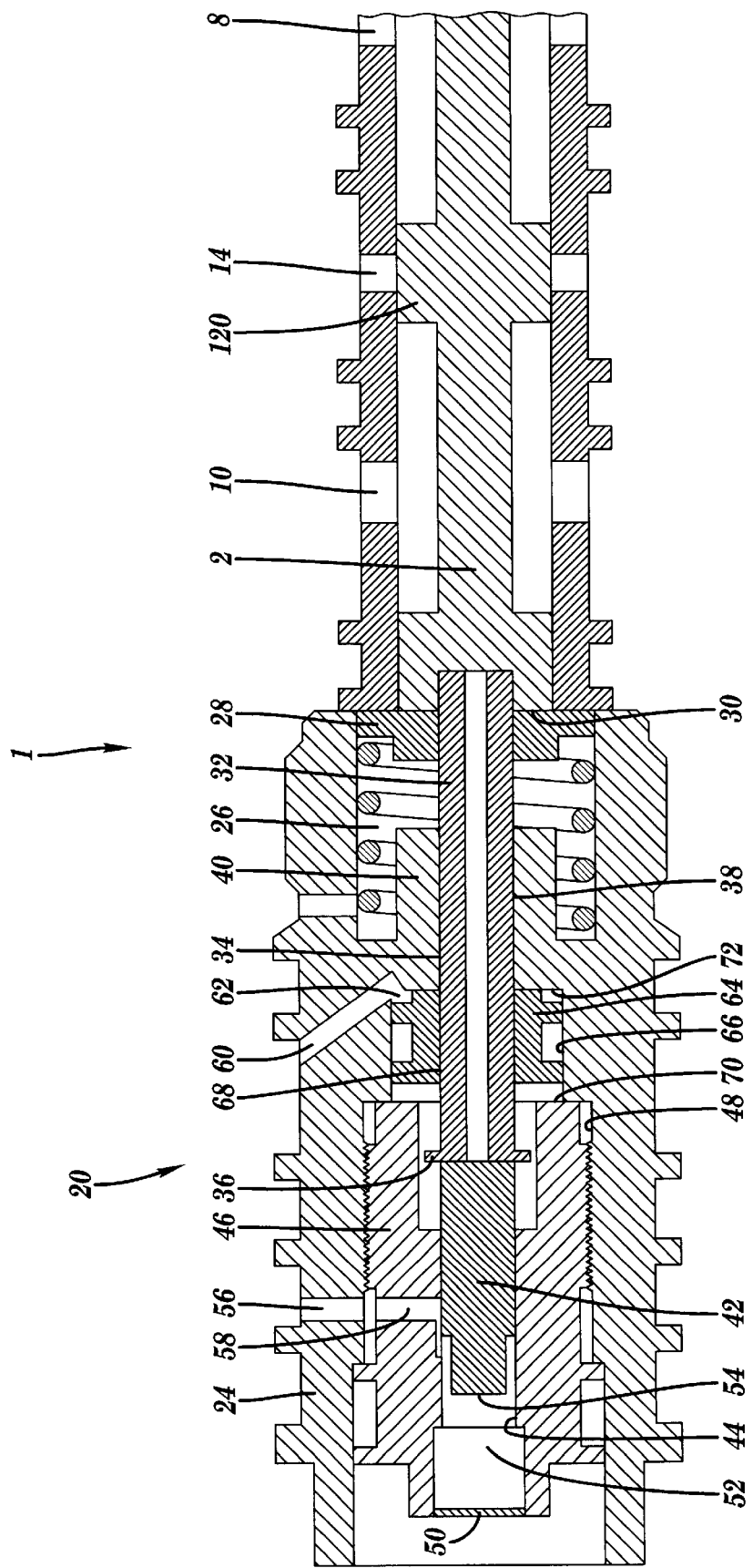
FIG. 2 is a cross-sectional view of a portion of the valve shown in FIG. 1. The valve portion is shown when the valve is in a no-flow condition.

Operatively connected to the spool 2 is a movable pusher member 32. As can be seen in FIG. 2, a major portion of the pusher member is located within the piston assembly 20. The pusher member includes an elongated, cylindrical body 34 that has an outwardly-extending flange portion 36 at one end. The body 34 is guided in its movement by a complementary thru-bore 38 in a tubular portion 40 of the piston assembly's body 24.

The flange portion 36 of the pusher member is located adjacent a pilot piston 42. The pilot piston is movably secured within a complementary thru-bore 44 of a guide unit 46. The guide unit is releasably-engaged to the inner wall 48 of the body 24 by a conventional fastening system, such as by the threaded engagement shown.

It should be noted that the diameter of thru-bore 44 is only nominally larger than the diameter of the cylindrical body of the pilot piston. The thru-bore 44 thereby functions to guide the pilot piston 42 as said piston moves back and forth in a direction parallel to the valve's longitudinal axis. It should also be noted that one or more seal members, such as o-rings (not shown), may be employed to form a seal between the pilot piston 42 and the thru-bore 44.

Located at one end of the guide unit 46 is a plug 50. The plug forms one wall of a variable volume chamber 52. The opposite wall of the chamber is formed by the rear surface 54 of the pilot piston. Fluid may travel into, or out of, the chamber 52 via a fluid passage 56 that extends through the body 24 of the piston assembly and via a connecting passage 58 in the guide unit. In this manner, when pressurized fluid is directed into chamber 52 via passages 56 and 58, the fluid will apply force on the piston 42 and thereby cause it to move toward the pusher member 32. Once the piston engages the pusher member, any forward movement of the piston will cause an equal forward movement of the pusher member and the connected spool 2.

The piston assembly's body 24 includes another fluid passage 60 that extends into a variable volume chamber 62. A movable stop piston 64 forms one wall of said chamber 62, and is slidable in a complementary bore 66 in the body 24 and along the body portion 34 of the pusher member. It should be noted that one or more seal members, such as o-rings (not shown), may be employed to form a seal between the stop piston 64 and bore 66. Similar or different conventional seal members may also be employed between the stop piston's bore 68 and the body portion 34 of the pusher member.

When pressurized fluid is directed into chamber 62, said fluid will apply pressure on the stop piston and cause the stop piston to move toward the guide unit 46. Once the stop piston contacts the forward end 70 of the guide unit, it will cease moving.

Since the flange portion 36 of the pusher member is larger in diameter than the thru-bore 68 of the stop piston, the stop piston can act to stop/limit the travel of the pusher member. Once the flange portion contacts the stop piston, it cannot move to the right unless the stop piston also moves to the right. A first stop for the pusher member occurs when the stop piston is pressed against the guide unit 46 by pressurized fluid in chamber 62. A second stop can occur when the stop piston is pressed against vertical wall 72 of the piston assembly's body 24. It should also be noted that since the pilot piston contacts and moves the pusher member, by stopping the pusher member, the stop piston also effectively stops/limits the travel of the pilot piston.

Figure 5:
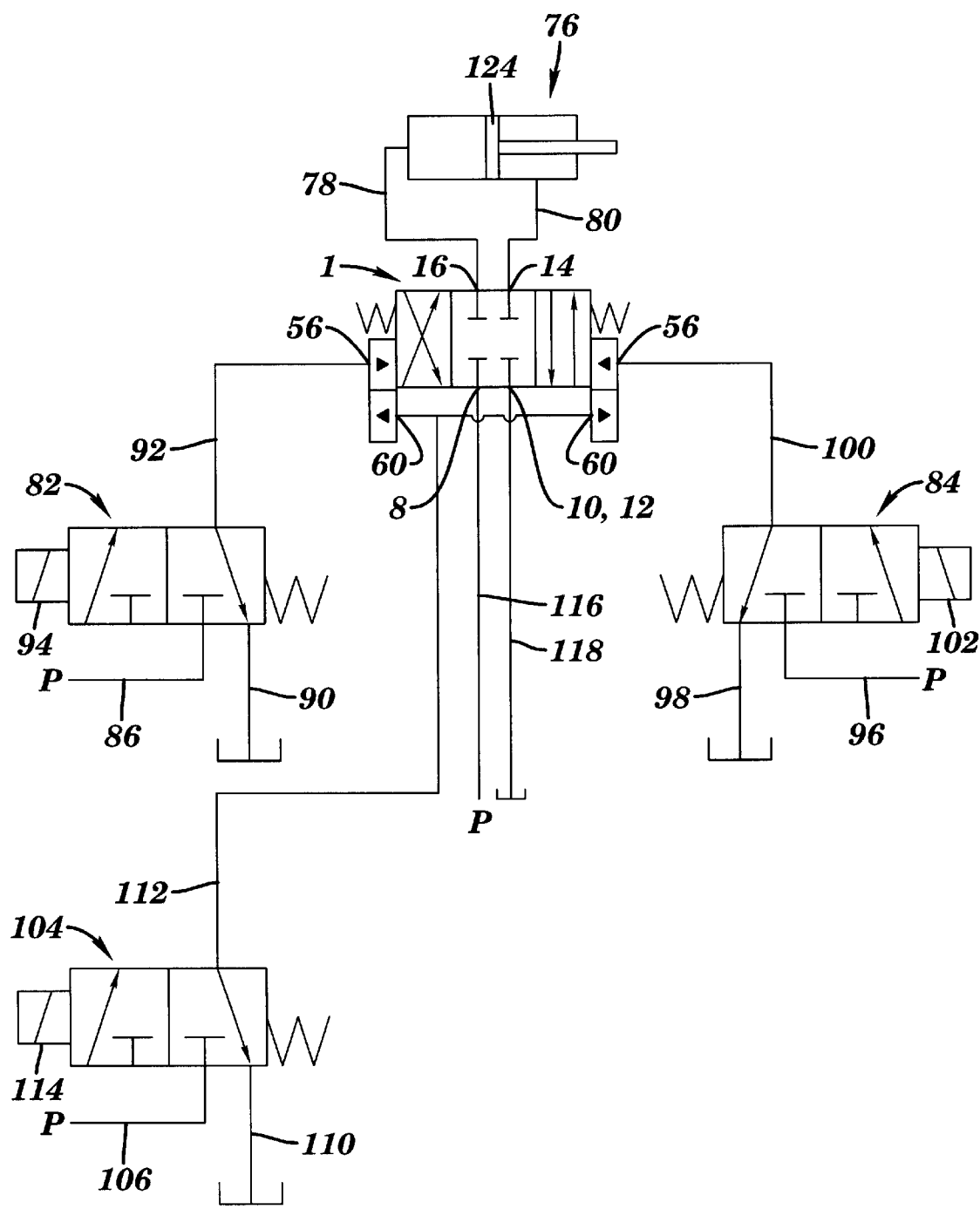
FIG. 5 is a system diagram showing the valve of FIG. 1 connected to a primary pilot, a secondary pilot and a hydraulic actuator.

FIG. 5 provides an example of a typical system in which the valve 1 would be employed. A hydraulic actuator 76 is connected to ports 14 and 16 of valve 1 via two fluid lines, 78 and 80. Valve 1 is shown connected to primary and secondary pilots. Two solenoid-actuated valves 82 and 84 form the primary pilot.

Valve 82 is connected to a source of pressurized fluid, such as a pump (not shown) or pressurized reservoir (not shown) via fluid line 86. The valve is also connected to a fluid return, such as a fluid sump (not shown), by a fluid line 90. The valve's fluid outlet line 92 connects to passage 56 of piston assembly 20. A user-actuable solenoid 94 is attached to the valve and functions to operate the valve. The valve enables the fluid outlet line 92 to be connected to either pressurized fluid from line 86 or to the fluid return via line 90.

Valve 84 is preferably identical to valve 82 and is connected to a source of pressurized fluid, such as a pump (not shown) or pressurized reservoir (not shown) via a fluid line 96. The valve is also connected to a fluid return, such as a fluid sump (not shown), by a fluid line 98. The valve's fluid outlet line 100 connects to passage 56 of piston assembly 22. A user-actuable solenoid 102 is attached to the valve and functions to operate the valve. The valve enables the fluid outlet line 100 to be connected to either pressurized fluid from fluid line 96 or to the fluid return via line 98.

It should be noted that when valves 82 and 84 are separate units from valve 1, the fluid lines 92 and 100 that connect them to the valve 1 would be pipes or hoses that extend between the associated valves. Alternatively, the valves 82 and 84 may be incorporated into a single valve block that would also contain valve 1. In the latter situation, fluid lines 92 and 100 would be passages in said valve block extending between the associated valves. While two separate valves 82 and 84 are shown forming the primary pilot, said valves can be replaced by a single four-way valve (not shown), such as a solenoid-operated spool valve.

A secondary pilot, in the form of a solenoid-operated valve 104, is also connected to the valve 1. Valve 104 is connected to a source of pressurized fluid, such as a pump (not shown) or pressurized reservoir (not shown) via a fluid line 106. The valve is also connected to a fluid return, such as a sump (not shown), by a fluid line 110. The valve's fluid outlet line 112 connects to passage 60 of both piston assemblies 20 and 22. A user-actuable solenoid 114 is attached to the valve and functions to operate the valve. The valve enables the outlet line 112 to be connected to either pressurized fluid from line 106 or to the fluid return via line 110.

Port 8 of valve 1 connects the valve to a source of pressurized fluid, such as a pump (not shown) or pressurized reservoir (not shown), via fluid line 116. This line would be used as the source of pressurized fluid for the actuator 76.

Ports 10 and 12 of valve 1 connect the valve to a fluid return, such as a sump (not shown), via a fluid return line 118. This return line is used to direct fluid expelled from the actuator to the fluid return.

Figure 3:
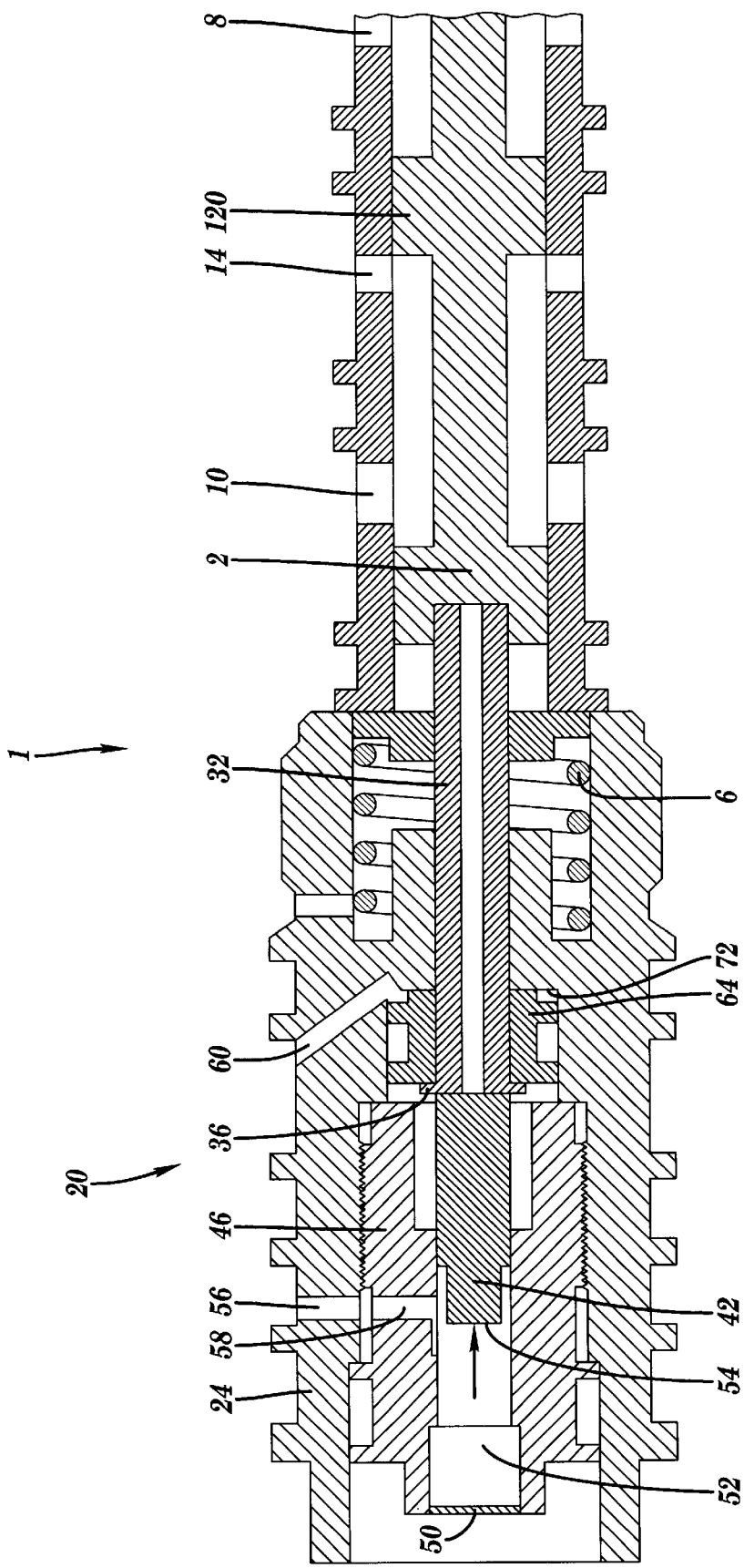
FIG. 3 is a cross-sectional view identical to that shown in FIG. 2 except that the valve portion is shown when the valve is in a full-flow condition.
Figure 4:
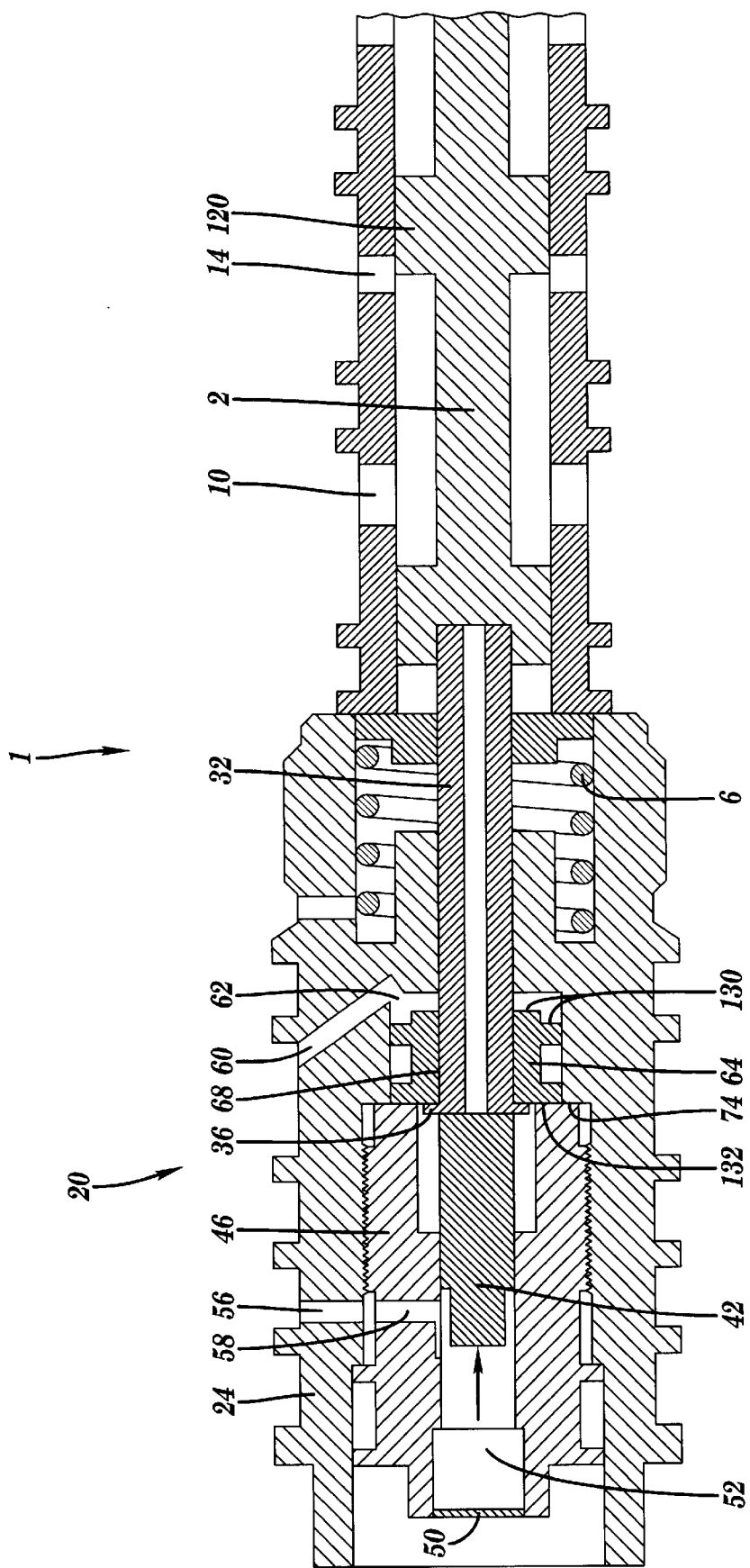
FIG. 4 is a cross-sectional view identical to that shown in FIG. 2 except that the valve portion is shown when the valve is in a limited-flow condition.

FIGS. 2–4 will now be described for a valve 1 operating in a system per FIG. 5.

FIG. 2 shows the piston assembly 20 and the center portion of the valve 1 when the valve is in a null, no-flow state whereby no pressurized fluid is being directed to the actuator 76. Passage 56 of the assembly is connected to return line 90 via line 92 and valve 82. Passage 60 of the assembly is connected to return line 110 via line 112 and valve 104. The spool is centered as the flange member 28 of both assemblies 20 and 22 presses against the spool due to the action of the springs 6. As one can see in this figure, the spool's land 120 completely blocks the valve's port 14 leading to the actuator 76 via fluid line 80. As one can also see in FIG. 1, the spool's land 122 completely blocks the valve's port 16 that leads to the actuator 76 via fluid line 78.

FIG. 3 shows the piston assembly 20 when the valve 1 is in a full, or maximum flow condition. The spool has been shifted to the right an amount whereby the spool's lands 120 and 122 have moved to a point where the valve's ports 14 and 16 are completely open/unblocked. At this point, pressurized fluid can readily flow from the high-pressure fluid line 116 into the valve 1 via port 8, and then into the hydraulic actuator's fluid line 80 via port 14. As the pressurized fluid enters the actuator, the actuator's piston 124 will move to the left (per FIG. 5) and cause fluid to be expelled from the actuator via fluid line 78. The fluid moves through line 78 and goes into the valve 1 via port 16. The returning fluid then flows to a fluid return via line 118 and the valve's port 10.

As one can see in FIG. 3, the full movement of the spool was achieved via a maximum movement to the right of the pilot piston 42. This was accomplished by sending power to solenoid 94 of valve 82. Once solenoid 94 was actuated, valve 82 enabled pressurized fluid to travel from line 86, through valve 82, through line 92, and then to chamber 52 via passages 56 and 58 in the piston assembly 20. The pressurized fluid applied force to the rear surface 54 of the pilot piston and pushed the pilot piston to the right. The forward end of the piston applied pressure on the spool 2 via the pusher member 32, and caused the spool to move to the right. It should be noted that the other piston assembly 22 enabled the spool to move to the right since its chamber 52 is open to the fluid return via its passages 56, 58, lines 98 and 100, and valve 84.

An important feature to note in FIG. 3 is that the pilot piston can only move to the right a limited distance. Its rightward travel preferably comes to a limit/stop when the flange portion 36 of the pusher member contacts stop piston 64 and presses said stop piston against vertical wall 72. Alternatively, the spool's travel can be limited by flange member 28 of piston assembly 22 contacting that assembly's tubular portion 40.

FIG. 4 shows the piston assembly 20, and a center portion of the valve 1, when the valve is in a limited-flow condition. At the point shown, the spool's lands 120 and 122 are only partially covering the fluid ports 14 and 16 respectively. The resultant restriction in the fluid path significantly reduces the rate of fluid flow to the actuator 76 from fluid line 80, and from the actuator via fluid line 78.

As can be seen in FIG. 4, the pilot piston 42 has only moved approximately half the distance it was allowed to move per FIG. 3. This reduction in its movement was the result of a leftward movement of the stop piston 64.

To achieve the limited flow to the actuator 76, valve 82 was actuated in the same manner as discussed previously relative to the full-flow condition shown in FIG. 3. However, at the same time, solenoid 114 of valve 104 was actuated. This enabled pressurized fluid to flow from fluid line 106, through valve 104, through fluid line 112, and then into the chambers 62 of both piston assemblies 20 and 22 via their associated passages 60.

Once the pressurized fluid entered the chamber 62 of each piston assembly, the fluid applied force against the rear face 130 of stop piston 64. This force caused the stop piston to move in a direction away from the spool until it's forward surface 132 contacted end 74 of the guide unit 46.

Once the stop piston is in the position shown in FIG. 4, the pilot piston can only move the pusher member until the flange portion 36 of the pusher member contacts surface 132 of the stop piston. Since the area of surface 130 of the stop piston is greater than the area of the rearward-facing surface 54 of the pilot piston, the force applied to the stop piston by the pressurized fluid in chamber 62 is greater than the force applied to the pilot piston by the pressurized fluid in chamber 52 (assuming the same fluid pressure in both chambers). As a result, the pilot piston cannot move the stop piston to the right of the position shown in FIG. 4. In this manner, the stop piston stops/limits the pilot piston's travel, and will only allow the pilot piston to move the spool to the right by the distance shown in FIG. 4. It should be noted that as the stop piston in piston assembly 20 was stopping the rightward movement of the assembly's pilot piston, the stop piston in piston assembly 22 also moved to abut end 74 of that assembly's guide unit. However, since the body of the pusher member is slidable in the bore of the stop piston, the movement of the stop piston in assembly 22 had no effect on the spool's movement. If the spool was being moved to the left through the action of the pilot piston of piston assembly 22, the stop piston in piston assembly 20 would similarly allow said movement.

Figure 6:
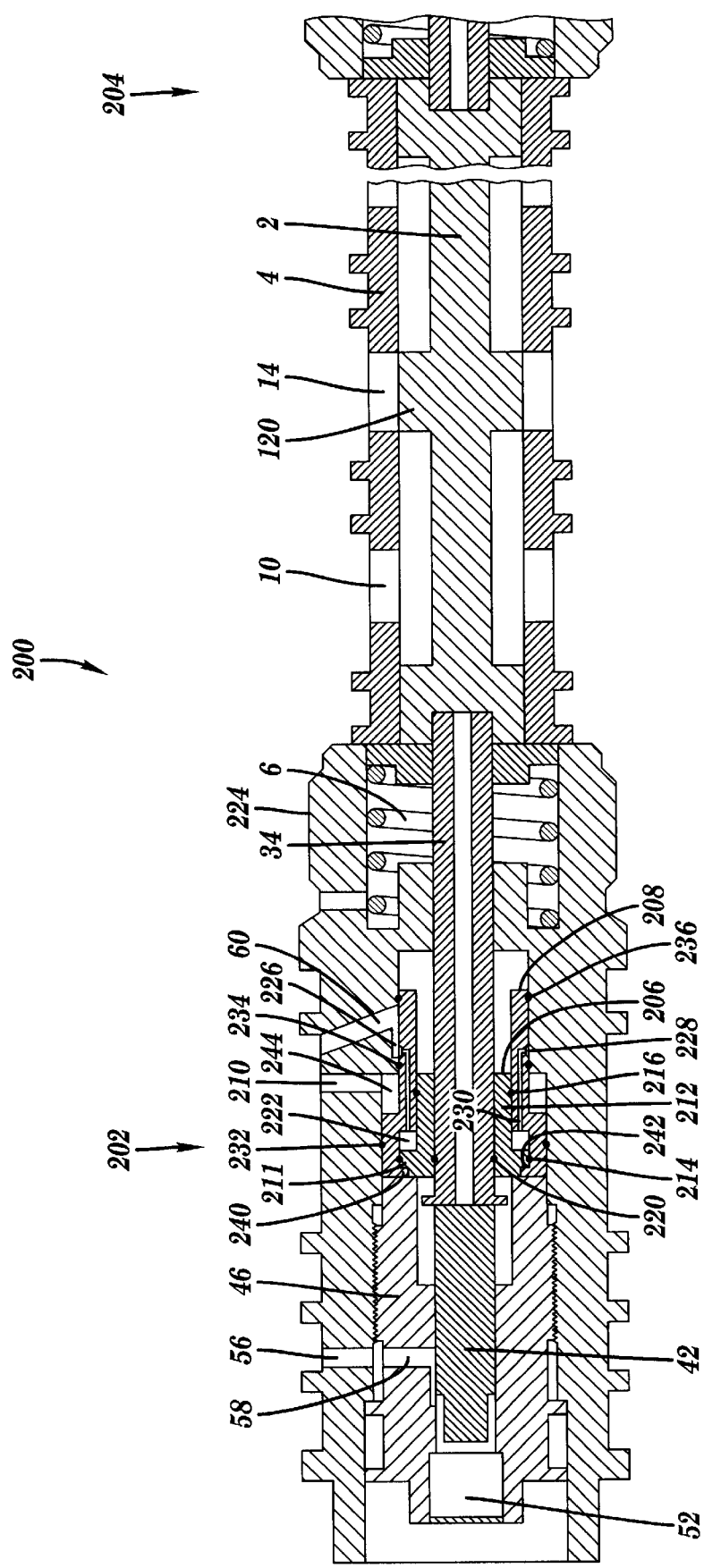
FIG. 6 is a cross-sectional view of a portion of a second embodiment of a multi-piston spool valve in accordance with the invention. The valve portion is shown when the valve is in a no-flow condition.

FIG. 6 provides a cross-sectional view of a portion of an alternate embodiment of a multi-piston spool valve 200 in accordance with the invention. The valve is shown in a no-flow condition.

Valve 200 is basically identical to valve 1, and includes a center-located spool 2 that has lands 120 and 122 that can cover or block ports 14 and 16 respectively. The spool can be shifted by the action of a pair of identical piston assemblies 202 and 204. The piston assemblies are located at opposite ends of the spool.

The difference between valve 1 and valve 200 lies in the structure and functionality of the piston assemblies. Piston assemblies 202 and 204 are very similar to the piston assemblies 20 and 22 of the first embodiment of the invention, with the primary exceptions being that each employs two stop pistons 206 and 208, and an additional fluid passage 210. The structure and functionality associated with the assembly's pilot piston is unchanged.

As can be seen in FIG. 6, the piston assembly 202 includes many of the same components as were employed in piston assembly 20. This includes the pilot piston 42, guide unit 46, pusher member 34, centering spring 6, and fluid passages 56, 58 and 60. All of the ports 8–16 in the center portion of the valve 200 can also be connected in the same manner as described in the first embodiment of the invention. While only land 120 can be seen in FIGS. 6–10, land 122 (note FIG. 1) will move in the same manner as land 120 and will cover or uncover its respective port 16 accordingly.

The stop pistons 206 and 208 are preferably tubular in shape and are located in a stacked, concentric relation. In this manner, and as will be described, the stop pistons can interact with each other and limit singly, or in combination, the movement of the pilot piston 42.

The first stop piston 206 has a flange portion 211 and an elongated body portion 212. As can be seen in the figure, two seal members, in the form of o-rings 214 and 216, provide a sealing engagement with the adjacent surface of the second stop piston 208. A third sealing member, o-ring 220, provides a sealing engagement with the outer surface of the pusher member 34. One should note in the figure that there is a small chamber 222 located between the first and second stop pistons. Fluid passage 60 in the body 224 of the piston assembly opens into an elongated groove 226. The groove 226 faces a complementary groove 228 in the second stop piston. The second stop piston includes a fluid passage 230 that connects groove 228 with the chamber 222.

The second stop piston 208 employs three seal members in the form of o-rings 232, 234 and 236 to seal the outer surface of the second stop piston to the adjacent inner wall of the body 224 of the piston assembly. One should note the depending lip 240 located at the end of the second stop piston. When the two stop pistons are in the position shown in the figure, lip 240 engages surface 242 of the first stop piston. This functions to stop/limit the travel of the first stop piston. When pressurized fluid is directed into chamber 222, the fluid will longitudinally force apart the two stop pistons until surface 242 engages lip 240.

One should also note that there is a chamber 244 located between the second stop piston and the inner wall of the body 224. When pressurized fluid is directed into this chamber via fluid passage 210 in the body 224, the fluid will push the second stop piston to the left until the end of the stop piston engages the end of the guide unit.

Figure 11:
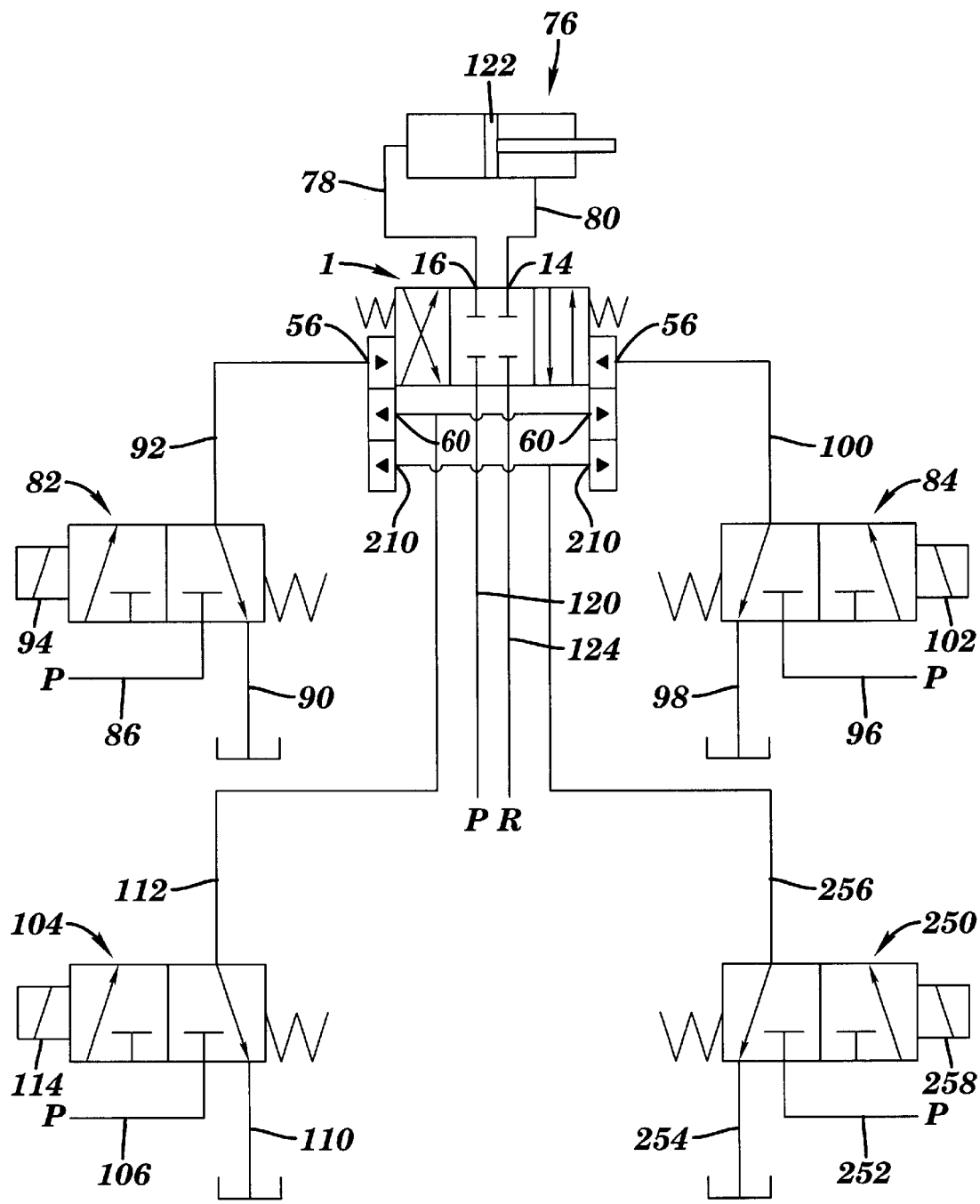
FIG. 11 is a system diagram showing a valve modified per FIG. 6 connected to a primary pilot, two secondary pilots and a hydraulic actuator.

FIG. 11 provides an example of a system diagram that would be used in conjunction with the valve 200. It should be noted that the only significant difference between this diagram and the diagram shown in FIG. 6 is that an additional valve 250 is employed to supply fluid to chamber 244 within each of the piston assemblies. Valve 250 is connected to a source of pressurized fluid, such as a pump (not shown) or pressurized reservoir (not shown) by fluid line 252. Fluid line 254 connects valve 250 to a fluid return, such as a sump (not shown). Fluid line 256 connects the output of the valve to fluid passage 210 in the body 224 of both piston assemblies 202 and 204. A user-actuable solenoid 258 is attached to the valve and functions to operate the valve. The valve enables the outlet line 256 to be connected to either pressurized fluid from line 252 or to the fluid return via line 254. It should be noted that the output line 112 of valve 104 is used to connect to fluid passage 60 in the body 224 of both piston assemblies 202 and 204. As noted previously, the passage 60 is employed in the second embodiment to provide a fluid connection to chamber 222.

Unlike the valve shown in FIG. 1, valve 200 has five different flow positions. FIGS. 6–10 show the different positions for the valve 200. The description of these figures is made in conjunction with a description of the valve's operation per the system shown in FIG. 11.

FIG. 6 shows the configuration of the piston assembly 202 when the valve is in a null, no-flow condition. At the time shown, there is no pressurized fluid being directed to any of the passages 56, 60 and 210. Springs 6 are centering the spool. At this point, ports 14 and 16 are completely covered/blocked by the spool's lands 120 and 122 and there is no flow of fluid to, or from, the actuator 76.

Figure 7:
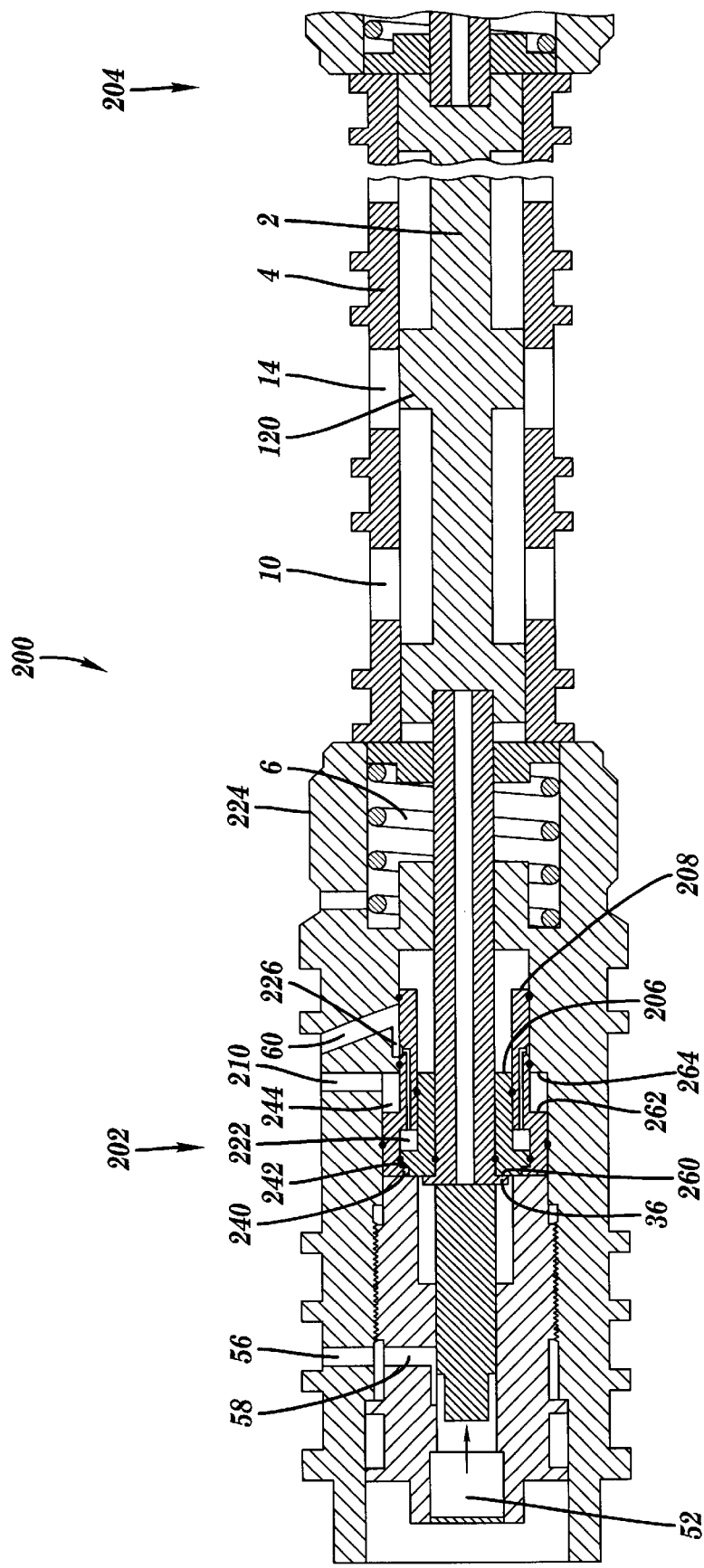
FIG. 7 is a cross-sectional view identical to that shown in FIG. 6 except that the valve portion is shown when the valve is in a first limited-flow condition.

FIG. 7 shows piston assembly 202 at a point when valve 200 is in a low-flow condition. This condition is achieved when all three of valves 82, 104 and 250 are enabling pressurized fluid to travel to passages 56, 60 and 210 respectively. Valve 84 is positioned to enable a return fluid flow from chamber 52 of piston assembly 204. The pressurized fluid entering chamber 52 of assembly 202 has caused the pilot piston to move to the right. As the pilot piston moved, it pushed the pusher member and spool to the right. The pilot piston's travel was stopped when the flange portion 36 of the pusher member contacted vertical surface 260 of the first stop piston 206.

It should be noted in FIG. 7 that the pressurized fluid flowing into chambers 222 and 244 caused the first and second stop pistons respectively to move to their maximum extent to the left. One should note that the vertical surface 262 of the second stop piston 208 is spaced from the adjacent vertical wall 264 of the body 224. The travel of the first stop piston relative to the second stop piston was stopped when the lip 240 of the second stop piston engaged vertical surface 242 of the first stop piston. At this point, the spool's lands 120 and 122 no longer completely block their respective ports 14 and 16, whereby said ports are now slightly open/unblocked. As a result, a low rate of fluid flow is enabled to the actuator 76 via line 80 and from the actuator via line 78.

Figure 8:
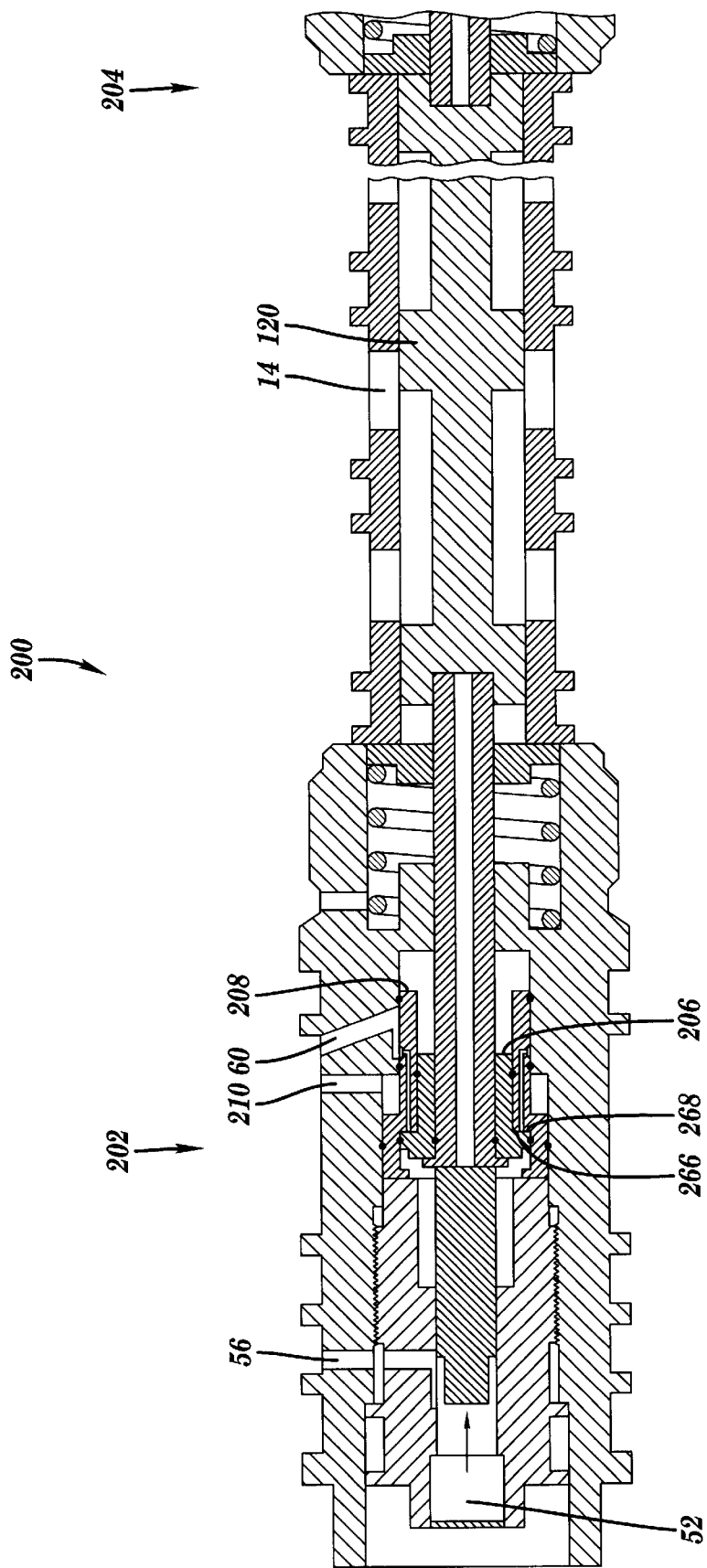
FIG. 8 is a cross-sectional view identical to that shown in FIG. 6 except that the valve portion is shown when the valve is in a second limited-flow condition.

FIG. 8 shows piston assembly 202 at a point when valve 200 is in a medium-flow condition. This condition is achieved when valves 82 and 250 are enabling pressurized fluid to travel to passages 56 and 210 respectively. At the same time, valve 104 is connecting passage 60 to the fluid return via line 110. Also at this time, valve 84 is positioned to enable a return fluid flow from chamber 52 of piston assembly 204.

As can be seen in FIG. 8, the pressurized fluid that has flowed into chamber 52 of the piston assembly 202 has caused the pilot piston to move to the right. As the pilot piston moved, it pushed the pusher member and spool to the right. The pilot piston's travel was stopped when the flange portion 36 of the pusher member contacted surface 260 of the first stop piston 206. It should be noted in the figure that the pressurized fluid from passage 210 has caused the second stop piston 208 to move to the left by its maximum extent, whereby the piston's surface 262 is spaced from the adjacent vertical wall 264. The lack of pressurized fluid to passage 60 has enabled the first stop piston to slide to the right whereby its vertical surface 266 now contacts the adjacent vertical surface 268 of the second stop piston. At this point, the spool's lands 120 and 122 have moved a small distance to the right from their positions of FIG. 7, thereby allowing a slightly greater opening of the ports 14 and 16 respectively. A medium rate of fluid flow, slightly greater than that allowed by the piston assembly configuration shown in FIG. 7, is now enabled to the actuator via line 80 and from the actuator via line 78.

Figure 9:
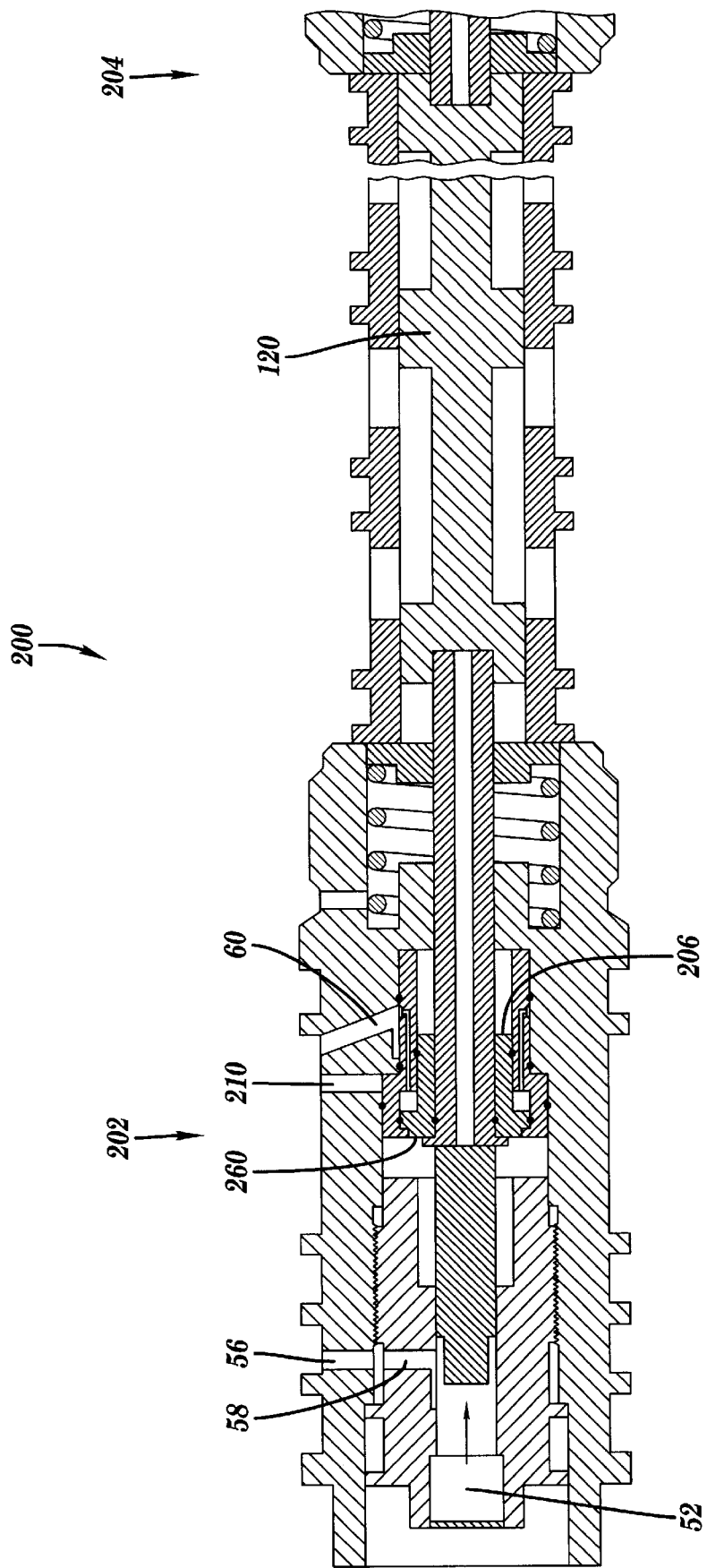
FIG. 9 is a cross-sectional view identical to that shown in FIG. 6 except that the valve portion is shown when the valve is in a third limited-flow condition.

FIG. 9 shows piston assembly 202 at a point when valve 200 is in a moderately high-flow condition. This condition is achieved when valves 82 and 104 are enabling pressurized fluid to travel to passages 56 and 60 respectively. At the same time, valve 250 is connecting passage 210 to the fluid return via line 254. Also at this time, valve 84 is positioned to enable a return fluid flow from chamber 52 of piston assembly 204. The pressurized fluid has caused the pilot piston to move to the right. As the pilot piston moved, it pushed the pusher member and spool to the right. The pilot piston's travel was stopped when the flange portion 36 of the pusher member contacted surface 260 of the first stop piston 206. It should be noted that the pressurized fluid from passage 60 caused the first stop piston to move to the left by its maximum extent. The lack of pressurized fluid to passage 210 has enabled the second stop piston to slide to the right whereby its vertical surface 262 contacts the adjacent vertical surface 264 of the body 224. At this point, the spool's lands 120 and 122 have moved a small distance to the right from their positions of FIG. 8, thereby allowing a slightly greater opening of the ports 14 and 16 respectively. Ports 14 and 16 are now almost completely unobstructed. As a result, a moderately high rate of fluid flow, slightly greater than that allowed by the piston assembly configuration shown in FIG. 8, is enabled to the actuator via line 80 and from the actuator via line 78.

Figure 10:
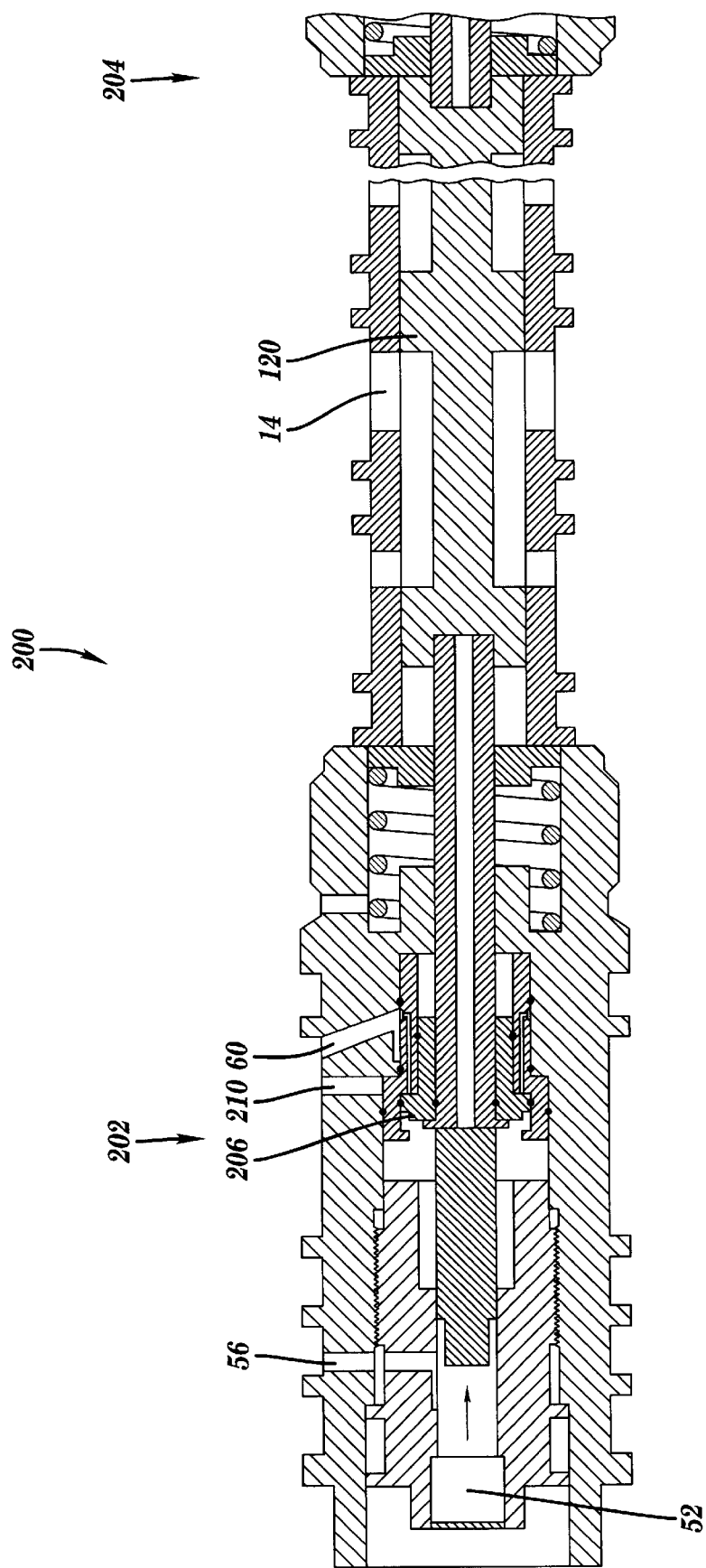
FIG. 10 is a cross-sectional view identical to that shown in FIG. 6 except that the valve portion is shown when the valve is in a full-flow condition.

FIG. 10 shows piston assembly 202 at a point when valve 200 is in a maximum-flow condition. This condition is achieved when valve 82 enables pressurized fluid to travel to chamber 52 via passage 56. At the same time, valves 104 and 250 are connecting passages 60 and 210 respectively to the fluid return via lines 110 and 254 respectively. Also at this time, valve 84 is positioned to enable a return fluid flow from chamber 52 of piston assembly 204. The pressurized fluid has caused the pilot piston to move to the right to the maximum extent possible. As the pilot piston moved, it pushed the pusher member and spool to the right. The pilot piston's travel was stopped when the flange portion 36 of the pusher member contacted surface 260 of the first stop piston 206. The lack of pressurized fluid in passages 60 and 210 has enabled both stop pistons to slide to the right, to their maximum extent. In the position shown, the vertical surface 262 of the second stop piston is contacting the adjacent vertical surface 264 of the inner wall of the body 224. Also in the position shown, the vertical surface 266 of the first stop piston is contacting the adjacent vertical surface 268 of the second stop piston. At this point, the spool's lands 120 and 122 have moved a small distance to the right from their positions of FIG. 9. Ports 14 and 16 are now completely unobstructed and enable a completely unrestricted flow of fluid to actuator 76 via line 80 and from the actuator via line 78.

While the functionality of the piston assemblies 20 and 202 have been shown and described, the functionality of piston assemblies 22 and 204 is basically identical. To enable piston assembly 22 or assembly 204 to move the spool to the left, valve 84 would be actuated in lieu of valve 82. The restricted flow positions would be caused in the same manner as previously described via the actuation of the secondary pilot valve(s).

Figure 12:
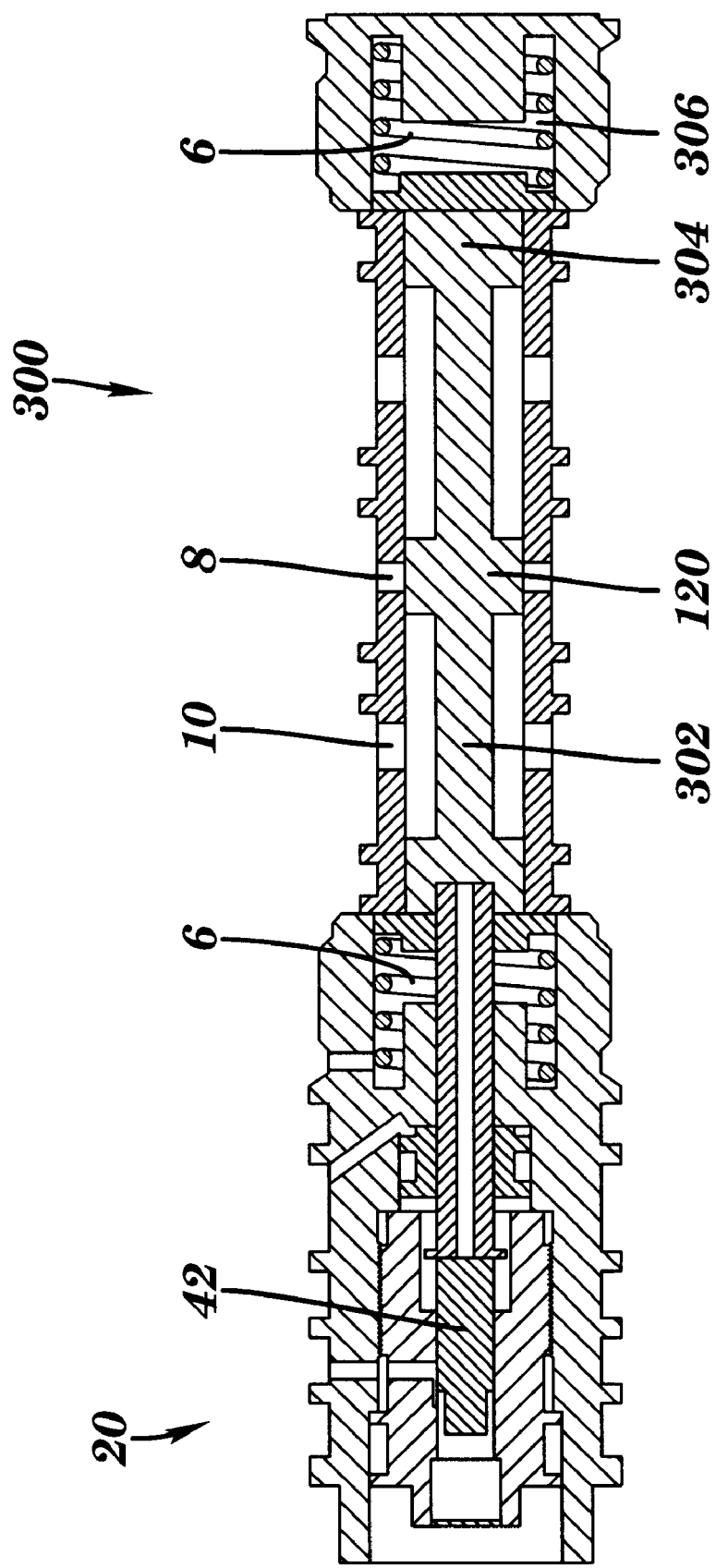
FIG. 12 is a cross-sectional view of a third embodiment of a multi-piston spool valve in accordance with the invention.

FIG. 12 provides a cross-sectional view of a multi-piston spool valve 300 in accordance with the invention. This type of valve would typically be employed when a reversible fluid flow is not required. An example of such an application is to control fluid flow to a hydraulic motor that is operating a cooling fan.

Valve 300 is very similar to valve 1, except that it only employs a single piston assembly. As shown, piston assembly 20 is located proximate one end of the valve's spool 302 and functions in the same manner as assembly 20 of the first embodiment. The piston assembly could be connected in the same manner as shown in FIG. 5 and cause rightward movements of the spool 302.

In operation, the valve's port 8 could be connected to a source of pressurized fluid, while the valve's port 10 could be connected to a load, such as a hydraulic motor. To uncover port 8, the piston assembly 20 moves the spool to the right. As the spool moves, its end 304 moves into a cavity 306 located at the opposite end of the valve. Two centering springs 6 are employed to bias the spool to a centered position. It should be noted that depending on the location of the pilot piston 42 and the operatively connected spool 302, land 120 will either prevent any fluid from flowing to the load, allow a restricted fluid flow to the load, or allow maximum fluid flow to the load. If one desires to allow multiple restricted fluid flows, the piston assembly 20 can be replaced by piston assembly 202, wherein piston assembly 202 would be connected much in the same manner as described in FIG. 11.

It should be noted in all embodiments of the invention that when pressurized fluid is directed into a fluid chamber associated with a pilot piston or stop piston, the fluid acts as a force applicator that causes the piston to move. While not shown, other conventional force applicators, such as a solenoid, spring, etc. may be used in lieu of a pressurized chamber to cause the movement of a pilot piston or stop piston. The use of other types of force applicators may not provide the simplicity or durability of the preferred fluid chambers. It should also be noted that the pusher member 32 is optional and can be replaced by a pilot piston that is shaped to incorporate the function of the pusher member and thereby apply pressure directly on the spool.

The previously-described fluid chambers 52, 62, 222 and 244 are all variable in volume. It should be noted that depending on the chamber configuration, the chamber's minimum volume may approximate zero. At such a point, the chamber would comprise the outlet of the fluid passage leading to said chamber.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A multi-piston spool valve assembly comprising:
   a spool translatable within a ported body, wherein when said spool is in a first position, a land of said spool completely obstructs a first port of said body, wherein when said spool is in a second position, said land only partially obstructs said first port, and wherein when said spool is in a third position, said first port is unobstructed by said land;
   a movable pilot piston operatively connected to said spool whereby movement of said pilot piston can cause a movement of said spool;
   a movable stop piston that can be positioned to create a limit to the movement of said pilot piston;
   a first fluid chamber, wherein said chamber is capable of being connected to a source of pressurized fluid and is operatively connected to said pilot piston whereby when pressurized fluid is within said chamber, said fluid can cause pressure to be applied to said pilot piston;
   a second fluid chamber, wherein said second fluid chamber is capable of being connected to a source of pressurized fluid and is operatively connected to said stop piston whereby when pressurized fluid is within said second fluid chamber, said fluid can cause pressure to be applied to said stop piston;
   wherein when said spool is in said first position and pressurized fluid is directed into said first fluid chamber but is not directed to said second fluid chamber, said fluid in said first fluid chamber will cause the pilot piston to move and thereby cause said spool to move to said third position; and
   wherein when said spool is in said first position and pressurized fluid is directed into both of said first and second fluid chambers, pressurized fluid in said first fluid chamber will cause the pilot piston to move in a first direction and cause a movement of said spool while pressurized fluid in said second fluid chamber will cause the stop piston to be located at a position where it prevents the pilot piston from moving a maximum distance whereby said pilot piston will only be capable of moving said spool to said second position.

2. The valve assembly of claim 1 further comprising at least one spring member that is operatively connected to said spool and acts to urge said spool toward said first position.

3. The valve assembly of claim 1 further comprising a guide member that features a thru-bore that functions to guide the pilot piston's movement.

4. The valve assembly of claim 3 wherein said guide member includes a portion that can contact and thereby limit the movement of the stop piston.

5. The valve assembly of claim 1 wherein said pilot piston, said stop piston and said first and second fluid chambers form a first piston assembly that is located adjacent a first end of said spool, and wherein a second piston assembly that is identical to said first piston assembly is located at a second end of said spool.

6. The valve assembly of claim 5 wherein each of said piston assemblies includes a spring member that is operatively connected to said spool and wherein both of said spring members can function to urge said spool toward said first position.

7. The valve assembly of claim 1 wherein the first fluid chamber incorporates a portion of said pilot piston, and wherein the second fluid chamber incorporates a portion of the stop piston.

8. The valve assembly of claim 1 further comprising a pusher member that is located between the pilot piston and an end of said spool, wherein said pusher member functions to transfer movement from said pilot piston to said spool.

9. The valve assembly of claim 8 wherein the pusher member includes a portion that can contact the stop piston whereby when said stop piston and said pusher member are in predetermined positions, the stop piston can prevent movement of said pusher member toward the spool and thereby functions to limit the movement of the pilot piston.

10. The valve assembly of claim 1 wherein said stop piston is a first stop piston, wherein said valve assembly includes a second movable stop piston located proximate said first stop piston, wherein said second stop piston can be moved to a position that limits the movement of the pilot piston, wherein a third fluid chamber is located in said valve assembly and is capable of being connected to a source of pressurized fluid, and wherein said third fluid chamber is operatively connected to said second stop piston whereby when pressurized fluid is within said third fluid chamber and said second stop piston is located in a first position, said fluid can cause said second stop piston to move to a second position; and
   wherein when said spool is in said first position and pressurized fluid is directed into said first, second and third fluid chambers, said fluid will cause the pilot piston to move in a first direction and cause a movement of said spool while pressurized fluid causes said first and second stop pistons to move to positions that limit said movement of the pilot piston whereby said pilot piston can only move said spool to a fourth position in which said land partially blocks said first port, and wherein said fourth position is different from said second position.

11. The valve assembly of claim 10 wherein when pressurized fluid is directed into said first and third fluid chambers but not into said second fluid chamber, pressurized fluid in said first fluid chamber will cause the pilot piston to move in a first direction and cause a movement of said spool while pressurized fluid in said third fluid chamber will cause the second stop piston to move to a position where it prevents the pilot piston from moving a maximum distance whereby said pilot piston can only move said spool to a fifth position in which said land partially blocks the first port, and wherein said fifth position is different from said second and fourth positions.

12. The valve assembly of claim 10 wherein the first and second stop pistons are tubular in shape, concentrically-oriented and wherein movement of said first stop piston toward or away from the spool is limited by a portion of said second stop piston.

13. The valve assembly of claim 10 wherein the third fluid chamber is located between portions of said first and second stop pistons.

14. The valve assembly of claim 13 wherein when pressurized fluid is directed into said third fluid chamber, said fluid pushes apart one portion of said first stop piston from an adjacent portion of said second stop piston.

15. The valve assembly of claim 10 further comprising a pusher member that is located between the pilot piston and an end of said spool, wherein said pusher member functions to transfer movement from said pilot piston to said spool, wherein the pusher member includes a portion that can contact the first stop piston whereby when said first stop piston is in a predetermined position, it prevents movement of said pusher member in a direction toward the spool and thereby functions to limit the movement of the pilot piston.

16. A multi-piston spool valve assembly comprising:
a spool translatable within a ported body, wherein when said spool is in a first position, a land of said spool completely obstructs a first port of said body, wherein when said spool is in a second position, said land only partially obstructs said first port, and wherein when said spool is in a third position, said first port is unobstructed by said land;
first and second piston assemblies operatively connected to opposite ends of said spool, wherein each of said piston assemblies comprises: a movable pilot piston operatively connected to said spool whereby movement of said pilot piston can cause a movement of said spool; a movable stop piston that can be positioned to create a limit to the movement of said pilot piston; a first fluid chamber that incorporates a portion of said pilot piston and is capable of being connected to a source of pressurized fluid; and a second fluid chamber that incorporates a portion of said stop piston and is capable of being connected to a source of pressurized fluid;
wherein when said spool is in said first position and pressurized fluid is directed into said first fluid chamber of said first piston assembly but is not directed to said second fluid chamber of said first piston assembly nor into said first and second fluid chambers of said second piston assembly, said pressurized fluid will cause the pilot piston of said first piston assembly to move in a first direction and thereby cause said spool to move to said third position; and
wherein when said spool is in said first position and pressurized fluid is directed into both of said first and second fluid chambers of said first piston assembly but not into the first and second fluid chambers of the second piston assembly, said fluid will cause the pilot piston of the first piston assembly to move in said first direction and cause a movement of said spool while pressurized fluid in said second fluid chamber of said first piston assembly will cause the stop piston of said first piston assembly to be located in a position where it prevents the pilot piston of said first piston assembly from moving a maximum distance, whereby said pilot piston of said first piston assembly will only be capable of moving said spool to said second position.

17. A multi-piston spool valve assembly comprising:
a spool translatable within a ported body, wherein when said spool is in a first position, a land of said spool completely obstructs a first port of said body, wherein when said spool is in a second position, said land only partially obstructs said first port, and wherein when said spool is in a third position, said first port is unobstructed by said land;
first, second and third fluid chambers that are each capable of being connected to a source of pressurized fluid;
a movable pilot piston operatively connected to said first fluid chamber and to said spool whereby movement of said pilot piston can cause a movement of said spool;
a first movable stop piston that is operatively connected to said second fluid chamber and can be positioned to create a limit to the movement of said pilot piston;
a second movable stop piston that is operatively connected to said third fluid chamber and can be positioned to create a limit to the movement of said pilot piston;
wherein when said spool is in said first position and pressurized fluid is directed into said first fluid chamber but is not directed to said second and third fluid chambers, said fluid will cause the pilot piston to move to a maximum extent and thereby cause said spool to move to said third position; and
wherein when said spool is in said first position and pressurized fluid is directed into both of said first and second fluid chambers but not into said third fluid chamber, pressurized fluid in said first fluid chamber will cause the pilot piston to move in a first direction and cause a movement of said spool while pressurized fluid in said second fluid chamber will cause the first stop piston to be located in a position where it prevents the pilot piston from moving a maximum distance, whereby said pilot piston will only be capable of moving said spool to said second position.

18. A multi-piston spool valve assembly comprising:
a spool translatable within a ported body, wherein when said spool is in a first position, a land of said spool completely obstructs a first port of said body, wherein when said spool is in a second position, said land only partially obstructs said first port, and wherein when said spool is in a third position, said first port is unobstructed by said land;
a movable pilot piston operatively connected to said spool whereby movement of said pilot piston can cause a movement of said spool;
a movable stop piston that can be positioned to create a limit to the movement of said pilot piston;
a first force applicator that when actuated is capable of applying a force on said pilot piston that causes a movement of said pilot piston;
a second force applicator that when actuated is capable of applying a force on said stop piston that causes a movement of said stop piston;

wherein when said spool is in said first position and then said first force applicator is actuated but said second force applicator is not actuated, said pilot piston will move and thereby cause said spool to move to said third position; and wherein when said spool is in said first position and then both of said first and second force applicators are actuated, said pilot piston moves and causes a movement of said spool while said stop piston moves to a position where it prevents the pilot piston from moving a maximum distance whereby said pilot piston will only be capable of moving said spool to said second position.

19. A fluid control system comprising:

a spool valve assembly, wherein said spool valve assembly comprises a piston assembly and a spool translatable within a ported sleeve, wherein when said spool is in a first position, a land of said spool completely covers a first port of said sleeve, wherein when said spool is in a second position, said land only partially covers said first port, and wherein when said spool is in a third position, said land does not cover said first port;

wherein said piston assembly of said spool valve assembly comprises: a movable pilot piston operatively connected to said spool whereby movement of said pilot piston can cause a movement of said spool; a movable stop piston that can be positioned to limit the movement of said pilot piston; a first fluid chamber that is capable of being connected to a source of pressurized fluid and that is operatively connected to said pilot piston whereby when pressurized fluid is within said chamber, said fluid can cause pressure to be applied to said pilot piston; a second fluid chamber that is capable of being connected to a source of pressurized fluid and that is operatively connected to said stop piston whereby when pressurized fluid is within said chamber, said fluid can cause pressure to be applied to said stop piston; wherein when said spool is in said first position and pressurized fluid is directed into said first fluid chamber but is not directed to said second fluid chamber, said fluid will cause the pilot piston to move and thereby cause said spool to move to said third position; and wherein when said spool is in said first position and pressurized fluid is directed into both of said first and second fluid chambers, pressurized fluid in said first fluid chamber will cause the pilot piston to move in a first direction while pressurized fluid in said second fluid chamber will cause the stop piston to move to a position where it prevents the pilot piston from moving a maximum distance whereby said spool will be moved to said second position;

a first pilot valve that is operatively connected to said spool valve assembly and is thereby capable of directing pressurized fluid into said first fluid chamber;

a second pilot valve that is operatively connected to said spool valve assembly and is thereby capable of directing pressurized fluid into said second fluid chamber;

a first fluid line connected to said first port;

a second fluid line connected to a second port of said valve assembly; and wherein when a load is connected to one of said fluid lines and a source of pressurized fluid is connected to the other of said fluid lines and said land does not cover said first port, pressurized fluid from said source of pressurized fluid can travel between said first and second ports and to said load.

20. The fluid control system of claim 19 wherein the piston assembly is a first piston assembly and is operatively connected to a first end of said spool, and wherein a second piston assembly that is identical to said first piston assembly is operatively connected to a second end of said spool.

21. The fluid control system of claim 20 further comprising a third pilot valve that is operatively connected to said spool valve assembly and is thereby capable of directing pressurized fluid into the first fluid chamber of the second piston assembly, wherein when said spool is in said first position and pressurized fluid is directed by the first pilot valve into the first fluid chamber of the first piston assembly, the spool is caused to move in a first direction, and wherein when said spool is in said first position and pressurized fluid is directed by the third pilot valve into the first fluid chamber of the second piston assembly, the spool is caused to move in a second direction that is opposite to said first direction.

22. The fluid control system of claim 21 wherein said second pilot valve is capable of directing pressurized fluid into the second fluid chamber of both of the first and second piston assemblies.

23. The fluid control system of claim 19 wherein the piston assembly includes a plurality of stop pistons that are capable of providing multiple limits to the movement of the pilot piston, wherein a first one of said plurality of stop pistons can be caused to move by pressurized fluid being directed into said second fluid chamber, and wherein a second of said stop pistons can be caused to move by pressurized fluid being directed into a third fluid chamber by a third operatively-connected pilot valve.

24. The fluid control system of claim 23 wherein said first and second stop-pistons are tubular in shape and concentrically-oriented.

25. The fluid control system of claim 23 wherein the third fluid chamber is located between portions of said first and second stop pistons.

26. The fluid control system of claim 19 further comprising a pusher member that is located between the piston assembly's pilot piston and an end of said spool, wherein said pusher member functions to transfer movement from said pilot piston to said spool, and wherein the pusher member includes a portion that can contact the stop piston whereby when said stop piston is in a predetermined position, it prevents movement of said pusher member toward the spool and thereby functions to limit the movement of the pilot piston.

27. A fluid control system comprising:

a spool valve assembly, wherein said spool valve assembly comprises first and second piston assemblies operatively connected to opposite ends of a spool translatable within a ported body, wherein when said spool is in a first position, a land of said spool completely covers a first port of said body, wherein when said spool is in a second position, said land only partially covers said first port, and wherein when said spool is in a third position, said land does not cover said first port;

wherein each of said piston assemblies of said spool valve assembly comprises: a movable pilot piston operatively connected to said spool whereby movement of said pilot piston can cause a movement of said spool; a movable stop piston that can be positioned to limit the movement of said pilot piston; a first fluid chamber operatively connected to said pilot piston and capable of being connected to a source of pressurized fluid; a second fluid chamber operatively connected to said stop piston and capable of being connected to a source of pressurized fluid; wherein when said spool is in said first position and pressurized fluid is directed into said first fluid chamber but is not directed to said second fluid chamber, said fluid will cause the pilot piston to move and thereby cause said spool to move to said third position; and wherein when said spool is in said first position and pressurized fluid is directed into both of said first and second fluid chambers, pressurized fluid in said first fluid chamber will cause the pilot piston to move in a first direction while pressurized fluid in said second fluid chamber will cause the stop piston to move to a position where it prevents the pilot piston from moving a maximum distance whereby movement of said pilot piston will cause said spool to move to said second position;

a first solenoid-operated pilot valve that is operatively connected to said spool valve assembly and is thereby capable of directing pressurized fluid into said first fluid chamber of said first piston assembly;

a second solenoid-operated pilot valve that is operatively connected to said spool valve assembly and is thereby capable of directing pressurized fluid into said first fluid chamber of said second piston assembly;

a third solenoid-operated pilot valve that is operatively connected to said spool valve assembly and is thereby capable of directing pressurized fluid into said second fluid chamber of both of said first and second piston assemblies;

a first fluid line connected to said first port;

a second fluid line connected to a second port of said valve assembly; and wherein when a load is connected to one of said fluid lines and a source of pressurized fluid is connected to the other of said fluid lines and said land does not cover said first port, pressurized fluid from said source of pressurized fluid can travel between said first and second ports and to said load.

* * * * *